US012561979B2

(12) United States Patent
Hernando et al.

(10) Patent No.: US 12,561,979 B2
(45) Date of Patent: Feb. 24, 2026

(54) PERSON ACTIVITY RECOGNITION

(71) Applicant: B/E Aerospace, Inc., Winston-Salem, NC (US)

(72) Inventors: Gonzalo Salinas Hernando, Cork (IE); Alejandro Garcia Gener, Cork (IE)

(73) Assignee: B/E AEROSPACE, INC., Winston-Salem, NC (US)

( * ) Notice: Subject to any disclaimer, the term of this patent is extended or adjusted under 35 U.S.C. 154(b) by 600 days.

(21) Appl. No.: 17/915,744

(22) PCT Filed: Mar. 30, 2021

(86) PCT No.: PCT/IB2021/052644
§ 371 (c)(1),
(2) Date: Sep. 29, 2022

(87) PCT Pub. No.: WO2021/198917
PCT Pub. Date: Oct. 7, 2021

(65) Prior Publication Data

US 2023/0120829 A1 Apr. 20, 2023

(30) Foreign Application Priority Data

Mar. 31, 2020 (GB) ..................................... 2004765

(51) Int. Cl.
*G06V 20/52* (2022.01)
*G06V 10/74* (2022.01)
(Continued)

(52) U.S. Cl.
CPC .............. *G06V 20/52* (2022.01); *G06V 10/74* (2022.01); *G06V 10/774* (2022.01); *G06V 10/82* (2022.01); *G06V 20/35* (2022.01)

(58) Field of Classification Search
None
See application file for complete search history.

(56) References Cited

U.S. PATENT DOCUMENTS 7,878,586 B2 2/2011 Kneller et al.
9,205,914 B1 12/2015 Fagan et al.
(Continued)

FOREIGN PATENT DOCUMENTS

WO WO-2020084060 A1 * 4/2020 ............. B64D 11/06

OTHER PUBLICATIONS

Combined Search and Exam Report for Application No. 2004765.0 mailed Sep. 14, 2020, 8 pages.
(Continued)

*Primary Examiner* — Andrew W Bee
(74) *Attorney, Agent, or Firm* — CANTOR COLBURN LLP

(57) ABSTRACT

A person activity recognition system (1) comprising: an image sensor (2) arranged to collect at least one image of a personal environment and generate image data (7) from the at least one image; and a processor (3) communicatively connected to the image sensor (2) to receive image data (7), and to a memory (4) and a database (5); the memory (4) including a list of detectable objects that may be present in the personal environment and corresponding results (8) relating to an activity of the person; and the processor (3) configured to execute a plurality of machine-readable instructions stored in a non-transitory computer readable medium in the memory (4), wherein the instructions, when executed by the processor (3), cause the processor (3) to: receive the image data (7); analyse the image data (7) to detect one or more objects in the personal environment; compare the detected object(s) with the list of detectable objects; and output to the database (5) a result (8) relating to an activity of the person.

13 Claims, 7 Drawing Sheets

(51) Int. Cl.

| | |
|---|---|
| ***G06V 10/774*** | (2022.01) |
| ***G06V 10/82*** | (2022.01) |
| ***G06V 20/00*** | (2022.01) |

(56) References Cited

U.S. PATENT DOCUMENTS

| | | | | |
|---|---|---|---|---|
| 9,305,216 | B1 | 4/2016 | Mishra | |
| 10,452,918 | B1 * | 10/2019 | Milanovic | G06V 20/10 |
| 2009/0193055 | A1 * | 7/2009 | Kuberka | G06F 16/51 |
| 2014/0275821 | A1 | 9/2014 | Beckman | |
| 2017/0283086 | A1 | 10/2017 | Garing et al. | |
| 2018/0268867 | A1 * | 9/2018 | Matsumoto | G11B 27/28 |
| 2019/0112050 | A1 | 4/2019 | Ibrahim et al. | |
| 2019/0180090 | A1 | 6/2019 | Jiang et al. | |

OTHER PUBLICATIONS

Notification of Transmittal of the International Search Report and the Written Opinion of the International Searching Authority, or the Declaration; PCT/IB2021/052644; Jun. 11, 2021, 13 Pages.

* cited by examiner

| OBJECT | | STATE |
|---|---|---|
| Person | → | Detected / Not Detected |
| Meal Table | → | Deployed / Not Deployed |
| Glass or Cup | → | Full / Empty / Not Detected |
| Plate | → | Full / Empty / Not Detected |
| Book | → | Detected / Not Detected |
| Blanket | → | Detected / Not Detected |
| Seatbelt | → | Open/Closed/Not Detected |
| Laptop | → | Open/Closed/Not Detected |
| Mobile Phone | → | Detected / Not Detected |

Figure 4a

| ACTIVITY RESULT | | ACTION |
|---|---|---|
| Sleeping | → | Do Not Disturb / Offer Blanket |
| Eating | → | Pick up Leftovers / Offer Drink |
| Drinking | → | Offer Drink / Clear Away cup / Offer Meal |
| Reading | → | Do Not Disturb / Offer Drink / Clear area |
| Working | → | Do Not Disturb / Clear Area |
| Idle | → | Offer blanket / Offer Drink / Offer Meal |
| Unoccupied | → | NONE |

Figure 4b

PERSON ACTIVITY RECOGNITION

CROSS REFERENCE TO RELATED APPLICATIONS

This is a US National Stage of Application No. PCT/IB2021/052644 filed Mar. 30, 2021, which claims the benefit of GB Application No. 2004765.0 filed Mar. 31, 2020, the disclosures of which are incorporated herein by reference.

TECHNICAL FIELD

The present disclosure relates to a person activity recognition system, for example a passenger activity recognition system for use in an aircraft cabin.

BACKGROUND

Integrated technology is becoming common in the aircraft cabin, both to aid with safety measures and help the crew use their time more efficiently and provide passengers with improved service.

It has been proposed to use built-in sensors to monitor fixtures in a car or an aircraft cabin, such as a sensor to detect whether a passenger is present in a seat, or a sensor to detect that the seat belt is fastened. In the context of an aircraft cabin, this would then allow the crew to remotely monitor the passengers without interacting with them, and ensure that passengers remain safe during take-off, landing, and other times during the flight.

It is desirable to collect more information about the passenger and the passenger's environment, including the objects that they are interacting with, without disturbing the passengers. This can allow for a recognition of passenger activity and hence anticipate passenger needs and allow the crew to serve the passenger more efficiently and effectively. The same considerations may apply to other personal environments, such as in a restaurant.

SUMMARY OF INVENTION

According to the present disclosure there is provided a person activity recognition system comprising:

- an image sensor arranged to collect at least one image of a personal environment and generate image data from the at least one image; and
- a processor communicatively connected to the image sensor to receive image data, and to a memory and a database,
- the memory including a list of detectable objects that may be present in the personal environment and corresponding results relating to an activity of the person; and
- the processor configured to execute a plurality of machine-readable instructions stored in a non-transitory computer readable medium in the memory, wherein the instructions, when executed by the processor, cause the processor to: receive the image data; analyse the image data to detect one or more objects in the personal environment; compare the detected object (s) with the list of detectable objects; and output to the database a result relating to an activity of the person.

It will be appreciated that such a system is not only able to detect one or more objects in the personal environment but also output a result relating to an activity of the person. For example, by detecting a plate and a glass it can be determined that the person is eating. In at least some examples, the list stored in the memory may take the form of a state machine or look-up table.

In at least some examples, the processor analyses the image data to detect an object in the personal environment by applying a machine learning algorithm to the image data. For example, the machine learning algorithm may be a deep learning algorithm such as a neural network, e.g. a convolutional neural network (CNN).

A machine learning algorithm provides the time- and cost-saving benefits of automation without requiring any human assessment of the image data and activity result. Furthermore, deep learning algorithms such as a convolutional neural network can be very reliable. A neural network can be trained by inputting a learning dataset, for example a number of images and image data relating to known objects that may be expected to be present in the personal environment.

In at least some examples, the processor is configured to undergo a training phase by receiving multiple examples of image data relating to known objects in the personal environment. In the training phase, the processor may receive a large amount of training data, for example hundreds of images of the object(s) to be detected (e.g. in different configurations, under different lighting conditions, etc.). As is known in the art, normally the training phase is done in a powerful non-embedded computer or even a server (as this phase requires high computational power) as a temporarily connected processor. After this the machine learning algorithm is deployed in the processor normally used by the system for analysis of image data, which is now an embedded platform for an inference phase during normal use of the system.

In at least some examples, the processor includes a central processing unit (CPU). In at least some examples, the processor includes one or more accelerators or integrated circuits such as a field-programmable gate array (FPGA), an Application-Specific Integrated Circuit (ASIC), or a Graphics Processing Unit (GPU). These accelerators or integrated circuits can help to compute the intensive parts of the machine learning algorithm. For example, the processor may include a Coral brand accelerator to run a CNN. In at least some examples, the image data is analysed by an accelerator or integrated circuit rather than the CPU. It will be appreciated that the accelerator itself does not execute instructions as an integrated circuit uses logic triggering transistors.

In addition, or alternatively, the processor may comprise any suitable logic, circuitry, interfaces, and/or code that may be configured to process the image data. Examples of a suitable processor include an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a complex programmable logic device (CPLD), a microcontroller, a central processing unit (CPU), and/or other control circuits. One or more such processors may be implemented. For example, a system on chip (SoC) integrated circuit may combine several of these processors in a single chip.

In order to assist the processor in analysing the image data to detect one or more objects, the image data may optionally include one or more of: texture, colour, shape, contrast. It is a feature of the present disclosure that the processor not only detects objects but also determines a result relating to an activity of the person. The activity result may take into account various factors, including spatial and/or temporal relationships between different objects and the physical state of an object as well as its presence.

In at least some examples, the processor analyses the image data to detect a spatial and/or temporal relationship between at least two of the detected objects and uses the spatial and/or temporal relationship to determine the result relating to an activity of the person. For example, if only a glass is detected then the activity result may be determined as drinking, but if both a glass and a laptop are detected then the activity result may be determined as working.

In at least some examples, in addition or alternatively, the processor analyses the image data to detect a temporal persistence for one or more of the detected objects. The processor may optionally use the temporal persistence to determine the presence of a detected object. For example, an object such as a plate may only be positively detected when it has a temporal persistence in a number (e.g. 10) of frames of image data. This can help to avoid a false positive or false negative of detected objects.

In at least some examples, in addition or alternatively, the list of detectable objects in the memory includes a plurality of different states for one or more of the detectable objects. For example, if a glass is detected then it may also be determined whether the state of the glass is full or empty. In at least some examples, the state of a detected object is used to determine the result relating to an activity of the person.

It will be appreciated that in the disclosed system, in at least some examples, the processor may analyse the image data to detect multiple objects in the personal environment. In a non-limiting example, the processor analyses the image data to detect an object in the personal environment by drawing a bounding box around a candidate object. Each candidate object may be assigned an associated probability, e.g. 80% certainty that the candidate object is a given object.

In various examples of the present disclosure, the system is able to detect one or more objects chosen from the following non-exhaustive list, wherein the object is a: person, table (e.g. a meal table, seatback tray table), beverage receptacle (e.g. glass, cup, can, etc.), food receptacle (e.g. plate, bowl, tray, etc.), book, blanket, seatbelt, laptop, mobile phone.

In examples of the present disclosure, the database can be consulted for the result relating to an activity of the person. Furthermore, in at least some examples, the processor is configured to output to the database the detected object(s) as well as the result relating to an activity of the person. Thus, the database may also be consulted for the detected object(s).

In at least some examples, the processor and/or the database is arranged to correlate the result with an action to be completed in response to the result. Thus, the database may also be consulted for one or more actions to be completed in response to the result.

In at least some examples, in addition or alternatively, the system further comprises a personal manifest communicatively connected to the database and arranged to output to the database personal preferences that may modify an action to be completed in response to the result. A more bespoke recommendation may therefore be provided for the action to be completed in response to the result. For example, if the activity result is sleeping then the personal manifest may specify whether the person likes to have an extra blanket or not.

In at least some examples, the database is communicatively connected to a device configured to indicate the result and/or an action to be completed in response to the result.

The system may therefore include such a device. The device may be configured to provide a visual and/or audible indication of the result and/or an action to be completed in response to the result. The indication may take the form of an alert.

In some examples, the database is communicatively connected to the device by a local connection such as a radio connection, e.g. Bluetooth®. In some examples, the database is communicatively connected to the device by a network connection, for example a LAN or the Internet. The database may be hosted by any suitable computing device or server, acting as a local host or in the cloud.

In at least some examples, the device includes a display and at least one of the indicated result and an action to be completed in response to the result is visually displayed via the display.

In at least some examples, in addition or alternatively, the device is fixed (for example, a wall-mounted display in service area of a restaurant or aircraft cabin) or the device is a mobile device (e.g. a handheld or wearable mobile device). In at least some examples, the device is a flight crew device.

According to at least some examples of the present disclosure, the database may receive inputs from multiple sources. In at least some examples, the system further comprises one or more additional sensor sub-systems, each additional sensor sub-system comprising at least one visual sensor, position sensor, weight sensor, or status sensor arranged to provide information about the personal environment, the one or more additional sensor sub-systems communicatively connected to the database and arranged to output to the database the information about the personal environment. Some examples of an additional sensor sub-system include a seat occupation sensor sub-system, seat position sensor sub-system, a tray table position sensor sub-system, and a seat belt sensor sub-system. Information about the personal environment may include a seat occupation state (occupied or unoccupied), a seat position (backwards, forwards, reclined, bed mode, etc.), a tray table position (open or stowed), and a seat belt status (open or closed). In at least some examples, the database may give preference to an activity result based on the image data. For example, if the processor analyses the image data to detect that the seatbelt object is not present, but the information received from the seat belt sensor sub-system is that the seat belt status is closed, then the database may still correlate the activity result (e.g. person not secured by seatbelt) with an action to be completed in response to the result. For example, an alert may be triggered that the person has fastened the seatbelt behind his/her back and the action to be completed is a manual check of whether the person is secured by the seatbelt.

In a system according to examples of the present disclosure, it is a benefit that the image sensor may not be networked. The image sensor generates image data for analysis by the processor and the image data may not be shared with any other device or system. This helps to ensure privacy for a person being monitored by the image sensor. In at least some examples, the processor is communicatively connected to the image sensor by a local wired connection, such as a USB connection, a ribbon cable with a CSI-2 interface connection, or similar.

According to at least some examples of the present disclosure, the image sensor, processor and memory are integrated in an activity recognition sub-system that is communicatively connected to the database by a network connection. For example, the activity recognition sub-system may be communicatively connected to the database by a LAN (e.g. Ethernet) connection. This means that the database can be in a remote location from the activity recognition sub-system.

In at least some examples, the activity recognition sub-system is fixedly located in a personal environment. For example, the activity recognition sub-system may be fixedly located in a passenger seat environment in an aircraft cabin. One or more passenger seats in an aircraft cabin may each comprise its own activity recognition sub-system. As a result, the database (and any device, as disclosed above, receiving an input from the database) may be located elsewhere e.g. in a separate service area or even in the cloud. All image analysis is carried out local to the personal environment and only an activity result is output to the database. This can be important to maintain personal privacy.

In at least some examples, in addition or alternatively, the processor is configured to discard the image data received from the image sensor after analysing the image data to detect one or more objects in the personal environment. This means that no personal image data is stored for longer than necessary. In at least some examples, no image data is transmitted external to the activity recognition sub-system.

In at least some examples, in addition or alternatively, the processor is configured to analyse the image data in real time to detect one or more objects in the personal environment. For example, all the processing can be done in real time, using a CNN or a similar method in a constrained and low-cost embedded activity recognition sub-system.

In at least some examples, in addition or alternatively, the image sensor is arranged to collect a single frame image of a personal environment and generate the image data from the single frame image. For example, the processor can extract features and detect objects from that single frame image data. This may be assisted by using a machine learning algorithm, such as a CNN, that is able to quickly detect objects without needing to compare multiple image frames as in other techniques such as a recurrent neural network (RNN). Furthermore, it will be appreciated that various machine learning algorithms are able to detect an object based on the image data from a single frame, or a limited number of frames, whereas gesture recognition techniques may require many image frames collected over a period of time.

The image sensor may be any suitable optical sensor sensitive to light in the ultraviolet, visible and/or infrared wavelength range. According to at least some examples of the present disclosure, the image sensor is a vision sensor e.g. a camera. The camera may be a colour video camera, a thermal camera, a depth sensor and one or multiple grayscale, global shutter tracking cameras. The image sensor may be implemented by use of a charge-coupled device (CCD) technology or complementary metal-oxide-semiconductor (CMOS) technology. Examples of implementations of the image sensor may include, but are not limited to, at least a closed circuit television camera, a digital camera, or an infrared camera.

The image sensor may comprise suitable logic, circuitry, interfaces, and/or code that may be configured to collect the at least one image of a personal environment. Examples of the one or more images may include a High Dynamic Range (HDR) image, a RAW image, and a JPEG image. The image sensor may include a lens assembly that may enable capture of the one or more images from a field of view of the image sensor.

In at least some examples, in addition or alternatively, the image sensor is fixed in position relative to a personal environment, such as a table (e.g. in a restaurant) or a seat or bed (e.g. in a transport vehicle such as a train, bus, ferry, aircraft, etc.). As is mentioned above, the personal environment may be a passenger environment in a transport vehicle, for example a passenger environment in an aircraft cabin.

In some examples, the image sensor is arranged to collect at least one image of a personal passenger environment in a transport vehicle e.g. train, ship, aircraft. In such examples, the person activity recognition system is a passenger activity recognition system. Thus, in at least some examples, the image sensor is arranged to collect at least one image of a personal passenger environment in an aircraft cabin.

The present disclosure relates to a computer-implemented system, and any of the features described in relation to the processor may be carried out under the control of a set of one or more processors.

DETAILED DESCRIPTION

Certain preferred examples of this disclosure will now be described, by way of example only, with reference to the accompanying drawings, in which:

FIG. 1 shows a schematic overview of an exemplary person activity recognition system;

FIG. 2 gives an example of a captured image and object detection;

FIG. 3 shows a schematic overview of a Convolutional Neural Network;

FIG. 4*a* shows an example of an object look-up table;

FIG. 4*b* shows an example of a database;

The system herein described is that of a person activity recognition system. It will be appreciated that there are many environments where recognising a person's activity can be seen as useful. In the examples shown here the person activity recognitions system is looking at passengers in an aircraft and is referred to as a passenger activity recognition system. It will be appreciated that this example is by no way limiting, and the system could be applied to various other environments.

Figure 1:
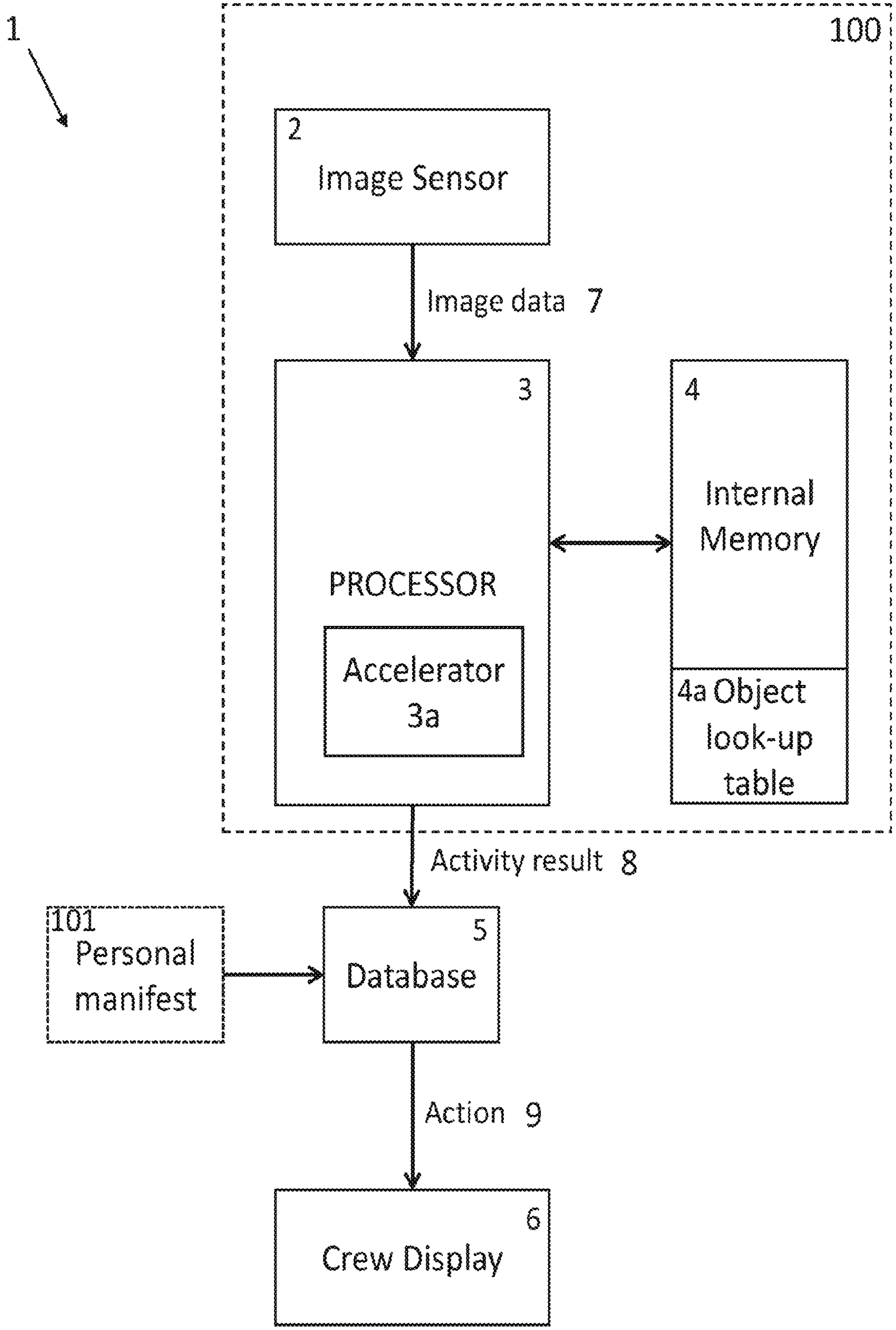

FIG. 1 shows a schematic overview an activity recognition system 1 comprising an image sensor 2, a processor 3, a memory 4 with object look-up table 4*a*, a database 5 and crew display 6. The image sensor 2 is operably connected to the processor 3 and sends image data 7 to the processor 3. The image sensor 2 is preferably a vision camera. Image data 7 can include single image frames which are then processed and deleted from the internal memory 4 by the processor 3 once the desired information has been extracted.

The image sensor 2, processor 3 and memory 4 are in this example integrated as a single unit of hardware, represented by the dashed box, representing an activity recognition sub-system 100. The activity recognition sub-system 100 is communicatively connected to the database 5 by a network connection (such as an Ethernet connection).

No image data is stored long-term within the activity recognition sub-system 100. At least one object is recognised by the processor 3 and an activity is determined based on the object(s) detected by comparison with the list of detectable objects in the look-up table 4*a*. The result of this is that an activity is identified and an activity result 8 is output to the database 5 via the network connection. In addition to the activity result 8, optionally the processor can also output the detected object(s) to the database 5.

In this example, all activity results 8 include a passenger identifier, linked to the seat number in the aircraft cabin and each activity recognition sub-system 100.

The processor 3 may comprise a number of processing units combined together in a SoC (System on Chip) architecture, as is known in the art. It is seen from FIG. 1 that the processor 3 includes an accelerator 3*a*. The processor 3 may include a number of different accelerators such as FPGA, ASICs or GPUs to compute the intensive parts of the machine learning algorithms. In this example the accelerator 3*a* is a Coral USB accelerator designed to implement a Neural Network (NN), for example a Convolutional Neural Network (CNN) in combination with other machine learning algorithms. In an example this CNN is built from Google's open source MobileNet V2 single shot detection or other similar artificial intelligence (AI) platform. It will be appreciated by a person skilled in the art that the basis for the Neural Network can be various different frameworks on which the specific nature of this system can be built.

The CNN of the processor 3 is designed to recognise specific objects from an image. Once the processor 3 has detected one or more objects then an activity is determined with reference to the look-up table 4*a*. From this a current activity of the passenger is determined and an activity result 8 is sent to the database 5. The activity result 8 is securely sent to the external database 5, for example via a secure Ethernet connection.

In the processor 3 and/or in the database 5, the activity result 8 is correlated with an action 9 to be completed in response to the result. For example, where the current activity of the passenger 16 is given, a suggested action for the cabin crew can be output. This activity result 8 can be, but is not limited to, e.g. eating, drinking, working and reading. The only limitation to the objects that can be recognised, the activity result 8 and the action 9 is the objects that the processor 3 is capable of recognising and the activities previously added to the object look-up table 4*a* and the database 5. From this an action 9 is optionally obtained and sent to a crew display 6.

The database 5 may include a communications interface arranged to establish a wired and/or wireless connection with the crew display 6. A wired connection may be achieved by an RS-232 link or Universal Serial Bus (USB) link or other well-known wired interface configuration. A wireless connection may be achieved by Bluetooth® or WiFi technology or the like. The database 5 may therefore include a communications interface in the form of a wireless transceiver.

Prior to the implementation of this system the CNN of the processor 3 is taught what each type of object, in various orientations and set-ups, looks like. The CNN of the processor 3 is taught by inputting large datasets of images in a training phase. For example, publically available image datasets such as COCO and OpenImages can be used. It can be appreciated that specific object images can also be customised to add to the dataset to teach the CNN of the processor 3. Aspects of objects that can be detected are for example and not limited to colour, shape, contrast and vector positioning. The CNN of the processor 3 can then learn from each input image to distinguish what each object is and classify it accordingly.

Some objects may look similar in different orientations, for example a closed laptop and a book, so the processor must be fed a dataset which covers these object orientations. In many examples the processor will be able to tell the difference between full and empty cups or glasses and plates of food. These different object states may be used to identify different activities.

As also seen in FIG. 1, a passenger may optionally have a personal manifest 101 of preferred responses to their detected activities which can be input to the database 5. These can limit or further define the action 9 sent to the crew display 6 based on the activity result 8 of the passenger.

Figure 2:
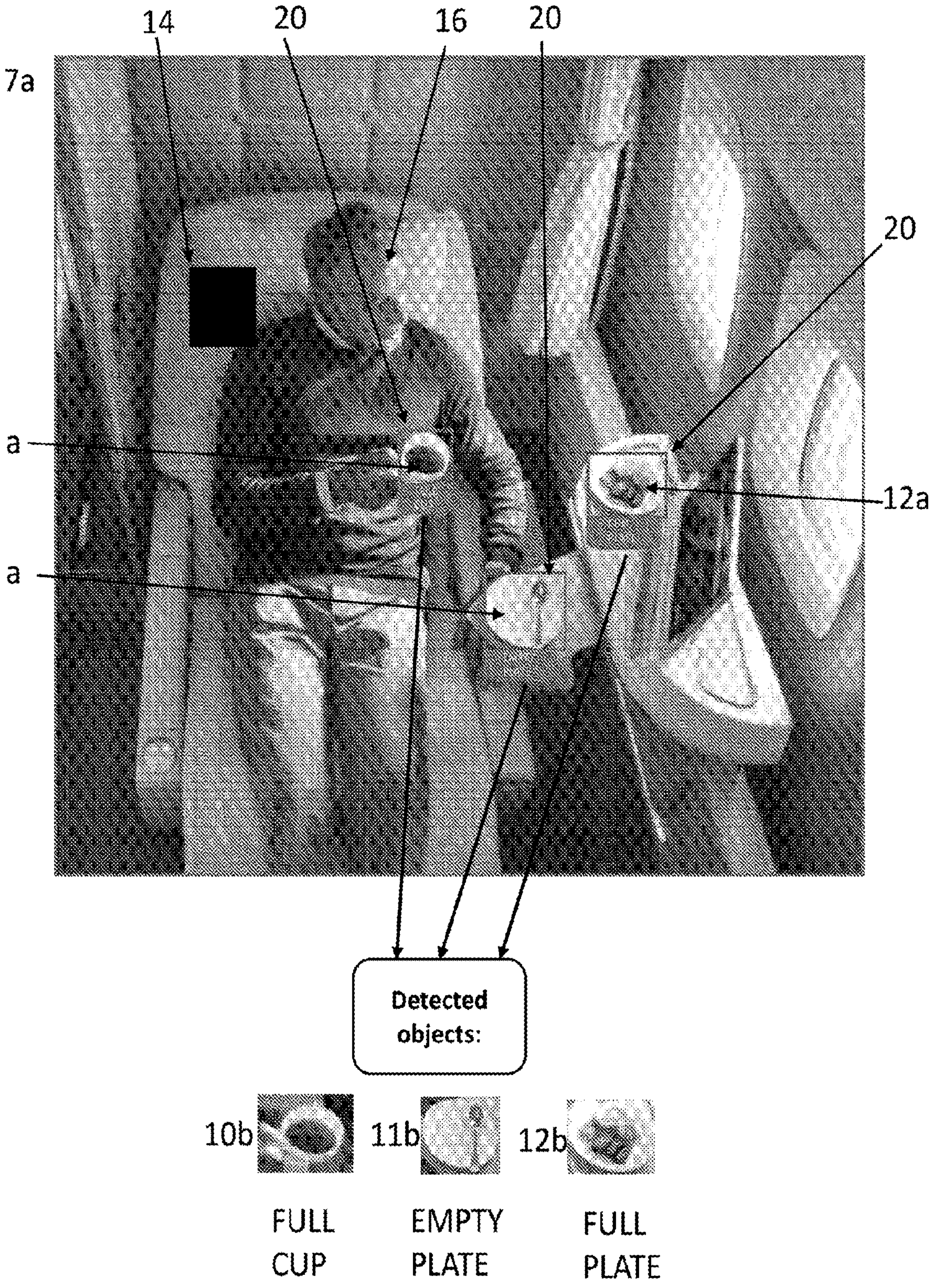

Once the image sensor 2 has sent the image data 7 to the processor 3, the CNN identifies one or more detectable objects and creates bounding boxes 20 surrounding them. An example of this is shown in FIG. 2, where a passenger 16 is sat in a seat 14 and is interacting with various objects 10*a*, 11*a*, 12*a*. The image sensor 2 is located so as to have a good view of the passenger seating area and any objects which the passenger 16 may interact with. In some examples that will require a single activity recognition sub-system 100 per passenger seat, however it will be appreciated that to integrate into a whole aircraft cabin some activity recognition sub-systems 100 may serve multiple passengers 16, where dedicated areas of the image data are associated with each passenger 16 or seat 14. In an example a large area, for example a first class seat 14, may require a plurality of image sensors 2 within a single activity recognition sub-system 100.

An image 7*a* is taken by the image sensor 2 and sent to the processor 3 to be analysed by the CNN. As mentioned above, the CNN is able to detect objects present in the image 7*a*, for example by extracting features (in the convolutional layers seen in FIG. 3). Bounding boxes 20 are then placed around the detected objects in the image 7*a*, in this example there is a cup 10*a*, a plate 11*a* and another plate 12*a*. The bounding box is created in pixels in the image 7*a*. The CNN or other machine learning algorithm can detect objects and optionally also the object state, e.g. a full cup 10*b*, an empty plate 11*b* and a full plate 12*b*. The detected objects are stored by the processor 3 in the memory 4 and may also be output to the database 5. No image data from the captured image frame is retained in the activity recognition sub-system 100.

The detection of an object may have an associated probability, the CNN is unlikely to have 100% certainty of every object, due to confusions like those already mentioned. For this reason the CNN may associate the detection of an object with a probability. Each bounding box may therefore be labelled with an associated probability for the detected object within the box. If the probability of a detected object is over a given threshold then the associated activity will be selected within the processor 3, by consulting the object look-up table 4*a*. The threshold probability may depend on how the system is trained, light conditions and size of the image, for example. A suitable threshold probability can be tested in different environments on models.

Figure 3:
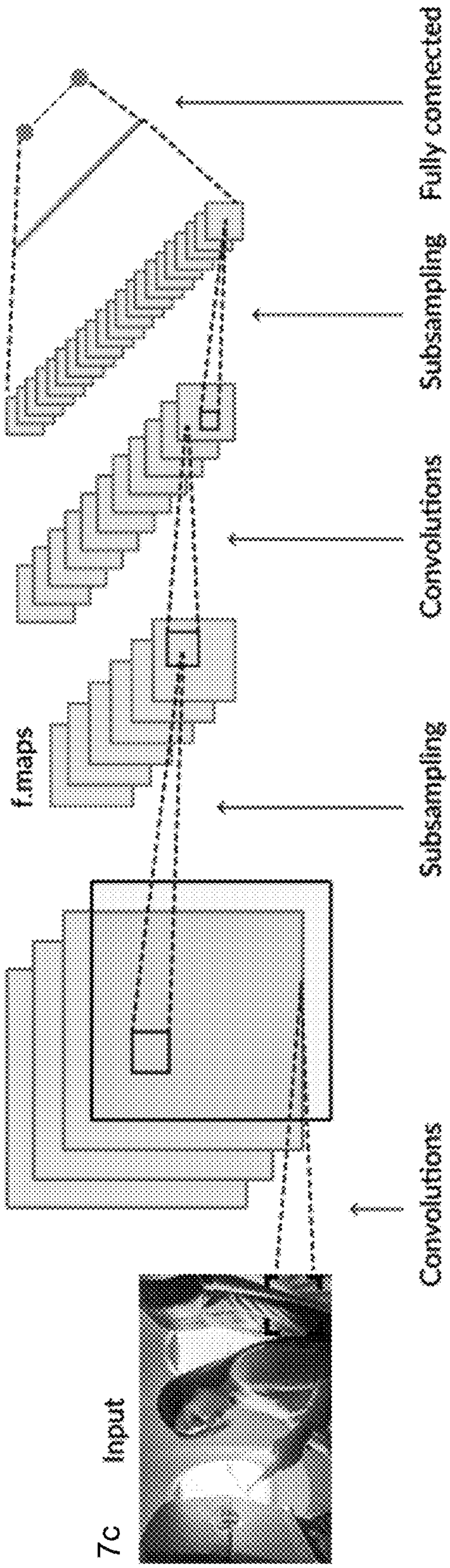

FIG. 3 shows a representation of how the CNN applied by the processor 3 collects image data from an image to work out what the object is. A single frame image 7*c* is input into the CNN of the processor 3, and a first few convolutional layers make convolution operations to extract features. The spatial relation of these features to each other allow an object to be located within the image 7*c*. Once this is achieved the fully connected last layers give a probability of a detected object. Each detected object is identified within a bounding box 20, as shown in FIG. 2.

FIG. 4*a* gives an example of an object look-up table 4*a*, where each detected object also includes a current state. From the detected object(s) (and optionally the current state) an activity result 8 can be given, as seen by the flow diagram of FIG. 5.

FIG. 4*b* gives an example of the database 5 showing how an activity result 8 then leads to various actions 9 that can be output and taken by the crew for the passenger. If a passenger 16 has a personal manifest 101, the options within the database 5 may be altered or restricted based on passenger preference.

Figure 5:
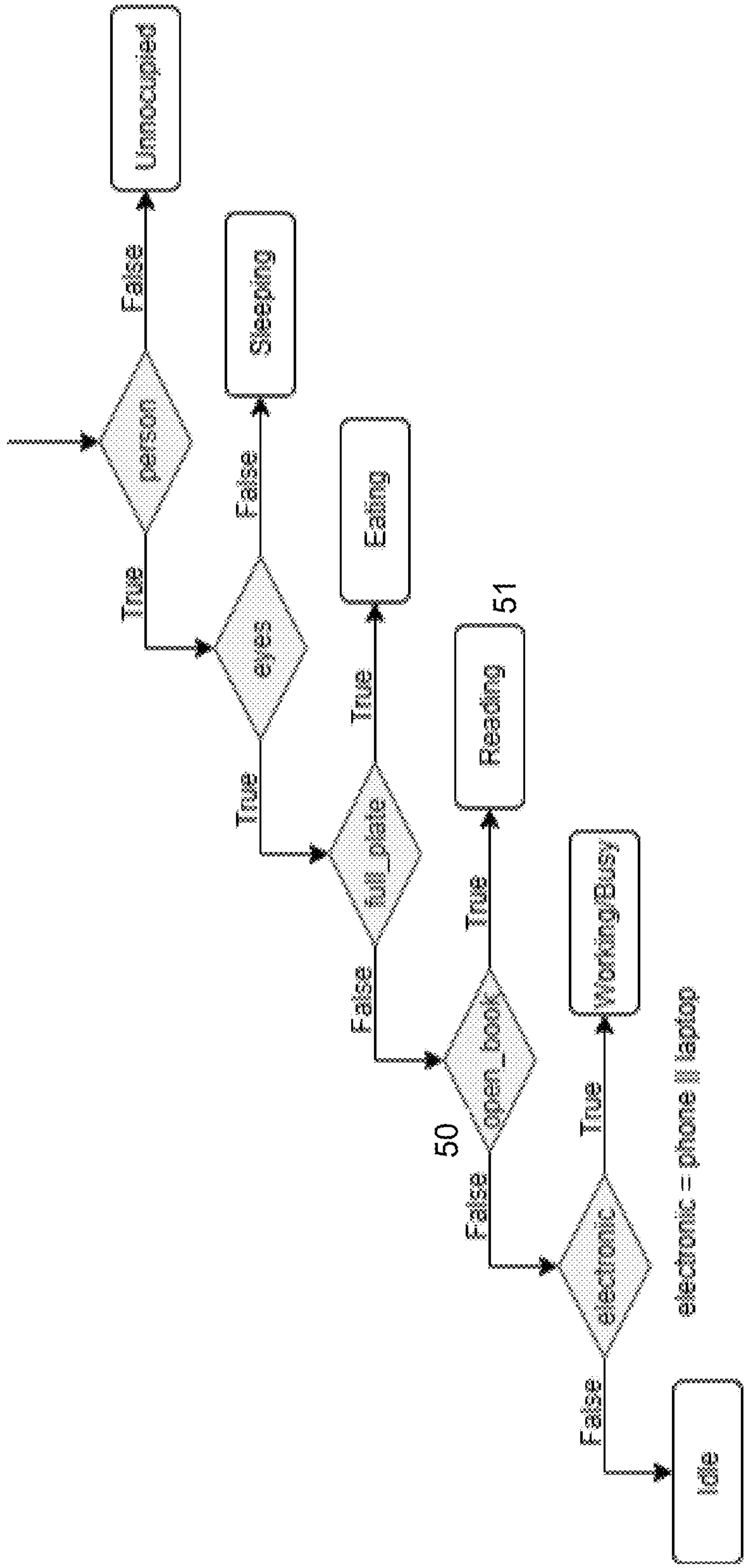
FIG. 5 shows a flow chart decision tree for activity recognition.

The flow diagram of FIG. 5 gives an example of a decision tree which can take place within the processor 3 to associate a current activity with the passenger 16. For example, if the processor 3 has identified an open book 50 the activity is recognised as reading 51. This then is sent as the activity result 8 to the database 5 where various actions 9 are sent to the crew display 6. In such a situation the crew can then decide on an action, for example not to disturb the passenger, or to remove empty plates if required.

Figure 6:
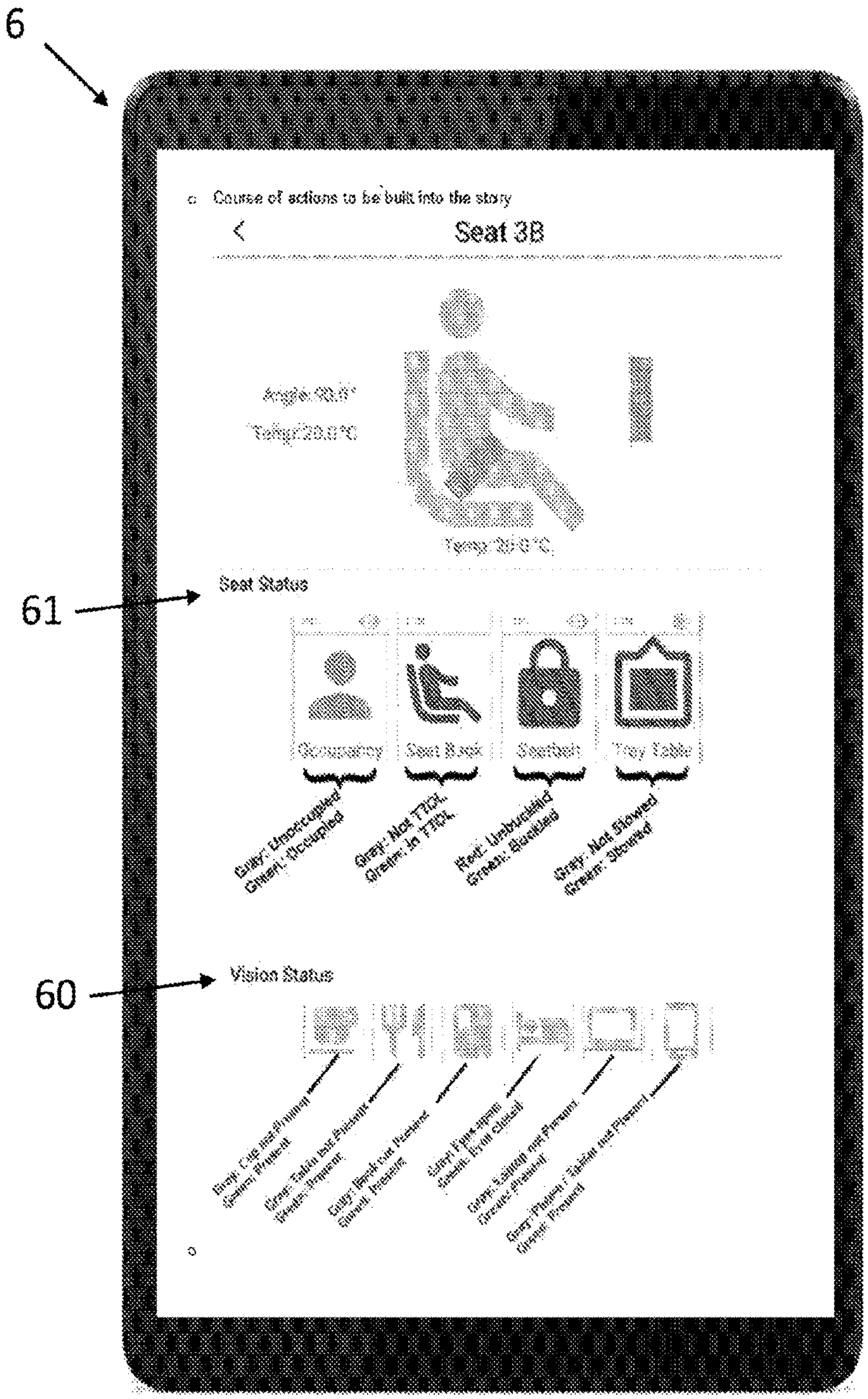
FIG. 6 shows an example of a crew display.

FIG. 6 gives an example of how the action 9 is shown on the crew display 6. In this example the crew display 6 is shown on a personal mobile device, however various other forms of display could be used, including various forms of personal handheld devices such as a tablet or a fixed display for example in the crew area. Various information can be displayed on the crew display 6, including aspects not associated with the passenger activity recognition system. The action 9 acquired through the activity recognition sub-system 100 and then the database 5 is displayed as vision status 60 to indicate current activity of the passenger 16. It will be appreciated that this crew display 6 is one example only, and a crew display 6 could display the action 9 or the activity result 8 in many different ways according to the specific object detected, activity result 8 and action 9 resulting from the database 5.

All data in this system has a unidirectional flow, and no image data 7 is stored for any length of time. Image data 7 is sent to the processor 3 with a direct wired connection and the image sensor 2 is designed to have no additional connectivity, to ensure images are only processed and then deleted by the processor 3, so there is no possibility of endangering the privacy of the passenger 16.

Within a single frame of image data 7 (for example the image 7*a* seen in FIG. 2) each detected object will have a spatial relationship with another object. The spatial relationship may be determined from the bounding boxes 20. For example, if food is detected in one bounding box and this bounding box is contained within the bounding box created for a plate then a full plate 12*b* is detected. Furthermore, the spatial relationship between at least two different detected objects can be used to determine the activity result 8 for the passenger 16. For example, if both a full cup 10*b* and a full plate 12*b* are detected in the same image 7*a* then the activity result is determined as eating.

Furthermore, the processor may analyse several sets of image data 7 obtained from multiple frames over time and look for temporal relationships between at least two detected objects. A temporal relationship can be evaluated between an object in one time frame and the same object in another time frame. For example, if a plate of food is left half full for over a certain length of time it may be considered that the passenger 16 has stopped eating and needs their plate clearing although the plate has not been indicated as empty.

Figure 7:
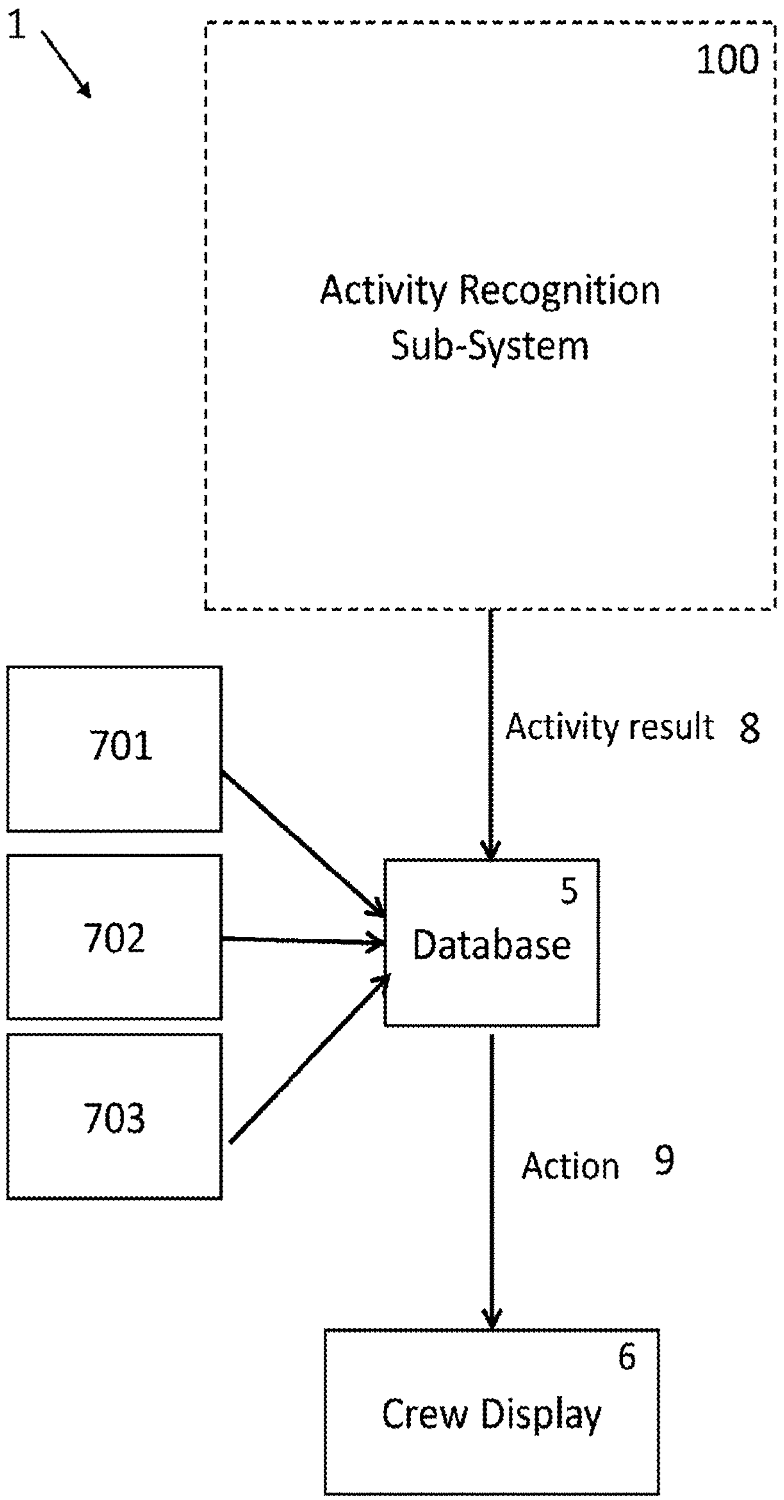
FIG. 7 shows an alternative example of a person activity recognition system.

FIG. 7 shows an example of how this system can be integrated with other (e.g. pre-existing) sensor sub-systems, which may be embedded into the aircraft cabin and seats 14. For example, a seat belt sensor sub-system 701, which can detect using a switch inside the seat-belt buckle whether the seat belt is fastened, a seat position sensor sub-system 702, which can detect any tilt in the seat, or a tray table position sensor sub-system 703, which can detect when the tray table is stowed or down for use. Another example of a sensor sub-system is a seat occupation sensor sub-system, for example using a pressure sensor in a seat pad to detect whether the seat is occupied or unoccupied. Information from these sensor sub-systems 701, 702, 703 can be input into the database 5 and can be associated with the activity result 8 to alter the action 9. The crew display 6 can display the outputs of these sensor sub-systems in addition to the activity result 8 and/or action 9 from the activity recognition sub-system 100. The activity recognition sub-system 100 can complement or override the information given by the other sub-systems and vice versa.

In the present disclosure, the objects detected by the image sensor 2 could also include for example the tray table and seat belt. Sensors may be previously integrated into these aspects of the passenger seat 14, however they are not always reliable. For example, a passenger 16 can lock the seat belt behind them on the seat and the seat belt sensor sub-system 701 would then believe the passenger is safe. By utilizing the passenger activity recognition system 1, the image data 7 can detect the seat belt and it can be determined that the seatbelt is properly secured around the passenger 16, where other sensors may be giving false readings. In this example the use of this passenger activity recognition system 1 can provide reliable information about various aspects around the passenger 16, where previously multiple sensors of different sorts could have been used. This can help with safety checks in the aircraft cabin, at take-off and landing, as well as in flight when the aircraft crew do not wish to disturb the passengers unnecessarily.

While the passenger activity recognition system 1 is online and active, no image data 7 or activity results 8 are stored, however action preferences for an individual passenger 16 can be stored to allow for customer customisation of the service they require and habits to be tracked and taken account of, this can also be done through the personal manifest 101. The database 5 in some examples can have an external connection to a server to collect historical data. In another example no data is stored, only real time information is transmitted to the crew display 6.

Whilst the majority of the learning for the CNN of the processor 3 must be done before installation, it will be appreciated that the dataset of known objects and activities can be updated when the system is offline to accommodate additional requirements. In an additional example, reinforcement learning can be implemented in the system if the system is online.

In the example presented here the passenger activity recognition system 1 is continuously active during travel, however in an additional example the system can be briefly triggered to obtain a status update of a passenger. In addition, or alternatively, the system could optionally be shut down by the passenger e.g. to respect privacy concerns.

Whilst the examples given here are for a passenger activity recognition system in an aircraft cabin, it will be appreciated by those skilled in the art that this system could be implemented in various transport vehicles such as, and not limited to, trains and ferries.

While the present disclosure has been described with reference to certain examples, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular examples disclosed, but that the present disclosure will include all examples and embodiments that fall within the scope of the appended claims.

The invention claimed is:

1. A person activity recognition system comprising:

an image sensor arranged to collect at least one image of a personal environment and generate image data from the at least one image; and a processor communicatively connected to the image sensor to receive image data, and to a memory and a database;

the memory including a list of detectable objects that may be present in the personal environment and corresponding results relating to an activity of the person;

the processor configured to execute a plurality of machine-readable instructions stored in a non-transitory computer readable medium in the memory, wherein the instructions, when executed by the processor, cause the processor to: receive the image data; analyse the image data to detect one or more objects in the personal environment; compare the detected object (s) with the list of detectable objects; delete the image; and output to the database a result relating to an activity of the person; and a personal manifest communicatively connected to the database and arranged to output to the database personal preferences that may modify an action to be completed in response to the result.

2. The system of claim 1, wherein the processor analyses the image data to detect an object in the personal environment by applying a machine learning algorithm to the image data.

3. The system of claim 1, wherein the processor is configured to undergo a training phase by receiving multiple examples of image data relating to known objects in the personal environment.

4. The system of claim 1, wherein the processor analyses the image data to detect a spatial and/or temporal relationship between at least two of the detected objects and uses the spatial and/or temporal relationship to determine the result relating to an activity of the person.

5. The system of claim 1, wherein the list of detectable objects in the memory includes a plurality of different states for one or more of the detectable objects.

6. The system of claim 1, wherein the processor and/or the database is arranged to correlate the result with an action to be completed in response to the result.

7. The system of claim 1, wherein the database is communicatively connected to a device configured to indicate the result and/or an action to be completed in response to the result.

8. The system of claim 1, further comprising one or more additional sensor sub-systems, each additional sensor subsystem comprising at least one visual sensor, position sensor, weight sensor, or status sensor arranged to provide information about the personal environment, the one or more additional sensor sub-systems communicatively connected to the database and arranged to output to the database the information about the personal environment.

9. The system of claim 1, wherein the image sensor, processor and memory are integrated in an activity recognition sub-system that is communicatively connected to the database by a network connection.

10. The system of claim 9, wherein the activity recognition sub-system is fixedly located in a personal environment.

11. The system of claim 1, wherein the processor is configured to discard the image data received from the image sensor after analysing the image data to detect one or more objects in the personal environment.

12. The system of claim 1, wherein the processor is configured to analyse the image data in real time to detect one or more objects in the personal environment.

13. The system of claim 1, wherein the image sensor is arranged to collect at least one image of a personal passenger environment in an aircraft cabin.

* * * * *